United States Patent
Sågström et al.

(10) Patent No.: US 8,708,609 B2
(45) Date of Patent: Apr. 29, 2014

(54) GEAR MILLING CUTTER AS WELL AS A REPLACEABLE MILLING INSERT THEREFOR

(75) Inventors: Thomas Sågström, Sandviken (SE); Jan Johansson, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 262 days.

(21) Appl. No.: 13/219,025

(22) Filed: Aug. 26, 2011

(65) Prior Publication Data

US 2012/0076595 A1 Mar. 29, 2012

(30) Foreign Application Priority Data

Sep. 24, 2010 (SE) ........................................ 1050996

(51) Int. Cl.
*B23F 21/14* (2006.01)
(52) U.S. Cl.
CPC ...................................... *B23F 21/14* (2013.01)
USPC .................................. 407/29; 407/21; 407/61
(58) Field of Classification Search
USPC ................ 407/21, 29, 42, 51, 55, 60, 61, 113
IPC ..................................... B23F 21/14; B23C 5/08
See application file for complete search history.

(56) References Cited

U.S. PATENT DOCUMENTS

| | | | | |
|---|---|---|---|---|
| 3,818,562 | A | * | 6/1974 | Lacey ............................. 407/40 |
| 4,411,564 | A | * | 10/1983 | Johnson ....................... 407/113 |
| 5,123,786 | A | * | 6/1992 | Yates et al. ..................... 407/38 |
| 5,330,295 | A | * | 7/1994 | Pawlik ............................ 407/42 |
| 6,227,772 | B1 | * | 5/2001 | Heinloth et al. ............. 407/113 |
| 2009/0136304 | A1 | | 5/2009 | Satran et al. | 
| 2011/0255925 | A1 | | 10/2011 | Yoshida |

FOREIGN PATENT DOCUMENTS

| | | | |
|---|---|---|---|
| JP | 05042411 A | * | 2/1993 |
| JP | 08071828 A | * | 3/1996 |
| JP | 2002-144129 | | 5/2002 |
| WO | WO 2008/044991 A1 | | 4/2008 |
| WO | 2010/073681 | | 7/2010 |
| WO | 2011/098239 | | 8/2011 |

OTHER PUBLICATIONS

English translation of JP 08071828.*
English translation of JP 0542411.*
European Search Report for Application No. 11 17 9979, dated Jan. 20, 2012.
Official Action for European Patent Application No. 11 179 979.7 dated Oct. 29, 2013.

* cited by examiner

*Primary Examiner* — Andrea Wellington
*Assistant Examiner* — Alan Snyder
(74) *Attorney, Agent, or Firm* — Morgan, Lewis & Bockius LLP

(57) ABSTRACT

Gear milling cutter with replaceable milling inserts mounted on flank sides. Some are root inserts placed in tangentially spaced-apart positions along the periphery of the basic body; others are flank inserts tangentially spaced-apart and in ring formation radially inside the root inserts. Sweep areas of radially separated inserts overlap in a ring-shaped overlapping zone by radially inner ends of root inserts being situated nearer the center axis than radially outer ends of the flank insert next inside. A part edge of the cutting edge, located between the straight main edge and one of the ends of the insert is shorter than the main edge and deviates from a straight reference line in the extension of the main edge at a deviation angle of at most 10°. Cutting edges of root inserts overlap cutting edges of flank inserts in a point of intersection situated between end points of the part edges.

21 Claims, 9 Drawing Sheets

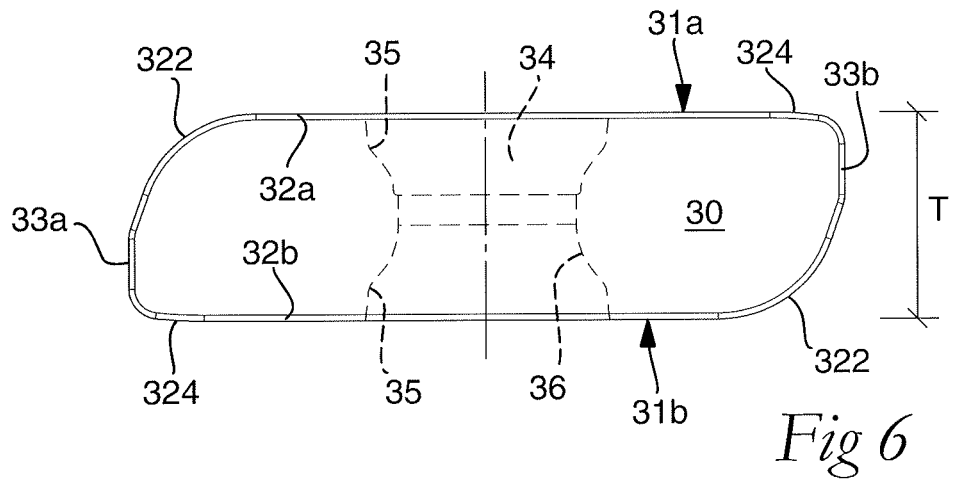
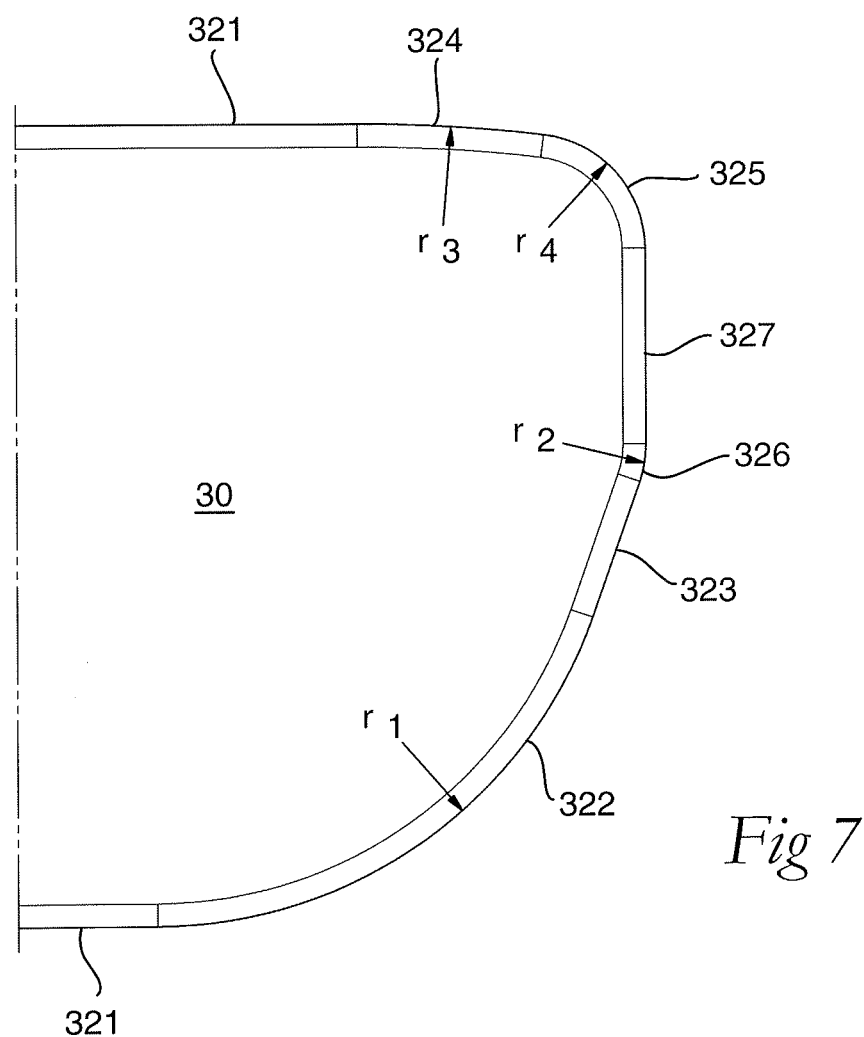

GEAR MILLING CUTTER AS WELL AS A REPLACEABLE MILLING INSERT THEREFOR

This application claims priority under 35 U.S.C. §119 to Swedish Patent Application No. 1050996-6, filed on Sep. 24, 2010, which is incorporated by reference herein in its entirety.

FIELD OF THE INVENTION

The present invention relates generally to a gear milling cutter of the type that includes, on one hand, a basic body being rotatable around a center axis and having a rotationally symmetrical basic shape, which includes two opposite flank sides that extend radially inward from the periphery of the basic body, and on the other hand a plurality of replaceable milling inserts, which are mounted on the flank sides and individually include a cutting edge that is formed between a chip surface and a clearance surface and extends between a pair of opposite and radially separated ends of the milling insert, and certain of which are root inserts, which are placed in tangentially spaced-apart positions along the periphery of the basic body, while others are flank inserts, which are tangentially spaced-apart and placed in at least one ring formation located radially inside the root inserts, sweep areas of radially separated milling inserts overlapping each other in a ring-shaped overlapping zone, more precisely by radially inner ends of at least the root inserts being situated nearer the center axis of the basic body than the radially outer ends of the flank insert next inside. The invention also relates generally to a gear milling cutter insert as such.

BACKGROUND OF THE INVENTION

Gear milling cutters of the above-mentioned type are foremost used for the roughing of metallic workpieces with the purpose of providing gear paths in miscellaneous machine elements, such as gear wheels, toothed plates, racks, etc. In industrial production, such rough milling is usually carried out by the workpiece being clamped in a stepwise movable holder, whereupon the milling cutter is fed rectilinearly (e.g. vertically) under rotation through a part of the workpiece while milling out an individual gash or tooth gap. This procedure is repeated by the holder being moved stepwise up to new positions in relation to the milling cutter, which mills out further gaps until a desired number of teeth or cogs have been created. The result of this initial rough milling becomes teeth or "tooth blanks" having a shape that reasonably adheres to the nominally prescribed, exact shape of the tooth, but that has not the final dimensional accuracy. Therefore, it is necessary to finish the teeth in one or more finishing operations, e.g. fine milling, grinding, hobbing, or the like, in order to finally achieve the desired dimensional accuracy. In this connection, it should be pointed out that the requirements of dimensional accuracy within the technical field in question often are about thousandths, rather than hundredths, of a millimeter. Therefore, in the concluding finishing process, it is about to remove tenths or hundredths of a millimeter to achieve prescribed tolerances in the gear paths.

In the gear milling cutter—as well as in other chip removing tools making use of replaceable, hard milling inserts—a varying number of sources of error are present that may disturb or entirely jeopardize the machining precision of the tool. For instance, the outcome in the production of the milling inserts may vary so far that the milling inserts at times swell and at times shrink in relation to their nominal, calculated dimensions (the errors are within the range of ±0.5%). Neither can it with absolute certainty be guaranteed that the seats in the basic body, in which the milling inserts are mounted, obtain their exact desired, solid geometrical positions in the same. Other sources of error that may affect the flank surfaces of the rough-milled teeth are, on one hand, the state (age) of the driving machine tool, and on the other hand the risk of emergence of vibrations.

A disadvantage of previously known gear milling cutters (see e.g., JP 2002144129 A) is the difficulty to master the inevitable surface imperfections that regularly arise in the flank surfaces of the teeth in connection with the initial rough milling. Such surface imperfections arise above all in the zones where the sweep areas of the milling inserts overlap each other, and may alternately manifest themselves in the form of convexities (e.g. ridges, bulges and the like) or concavities (e.g. grooves, pits, level differences) in the milled surface. With known gear milling cutters, the character of these surface imperfections cannot be predicted; something which later may make the concluding finishing operation more difficult. In practice, convexities are relatively simple to eliminate by, for instance, being ground down in relation to the surrounding surface, without the tolerances of the teeth being jeopardized. However, concavities are considerably more delicate because the surrounding surface layer has to be ground down or be removed until a smooth, dimensionally accurate flank surface is obtained. If the rough-milled flank surfaces—as most often is the case—include concavities as well as convexities that alternate with each other helter-skelter in unpredictable patterns, the concluding finishing operation becomes particularly awkward. In other words, there is a considerable risk of the prescribed tolerances not being achievable in connection with the concluding finishing operation; something that in the worst case may cause rejection of the workpiece. Such rejections are highly undesired considering that the finished product at times has a very high economical value.

The present invention aims at obviating the above-mentioned disadvantages of previously known gear milling cutters and at providing a gear milling cutter by which the surface imperfections in the rough-milled teeth can be predicted and thereby overcome.

An object of the invention to provide a gear milling cutter that on rough-milled teeth generates surfaces, above all flanks, which have a predictable shape and the inevitable surface imperfections of which are limited to convexities, contrary to concavities.

It should already here be emphasized that the invention in no way claims to be able to eliminate the concluding finishing operation. On the contrary, the invention is based on the understanding that each roughing gear milling cutter inevitably is impaired by sources of error, which make impossible absolute machining perfection, and that a concluding finishing operation always is required. Thus, the primary purpose of the invention is to facilitate the realization of the final machining while ensuring that desired tolerances of gear paths in expensive workpieces are maintained.

SUMMARY OF THE INVENTION

In an embodiment, the invention provides a gear milling cutter, including a basic body being rotatable around a center axis and having a rotationally symmetrical basic shape, which includes two opposite flank sides that extend radially inward from a periphery of the basic body, and a plurality of replaceable milling inserts, which are mounted on the flank sides and individually comprise a cutting edge that is formed between a chip surface and a clearance surface and extends between a pair of opposite and radially separated ends of the milling insert. Some of the plurality of milling inserts are root inserts, which are placed in tangentially spaced-apart positions along the periphery of the basic body. Others of the plurality of milling inserts are flank inserts, which are tangentially spaced-apart and placed in at least one ring formation located radially inside the root inserts. Sweep areas of radially separated milling inserts overlap each other in a ring-shaped overlapping zone by radially inner ends of at least the root inserts being situated nearer the center axis of the basic body than the radially outer ends of the flank insert next inside. The cutting edge of each milling insert includes a straight main edge, and a part edge that is located between the straight main edge and one of the ends of the milling insert and is shorter than the main edge, the part edge deviating from a straight reference line in the extension of the main edge in the direction of an end of the milling insert at a deviation angle ($\alpha$) of at most 10°. The cutting edges of the root inserts overlap the cutting edges of the flank inserts in a point of intersection situated between end points of the part edges.

In another embodiment, the invention provides a gear milling cutter insert, including a cutting edge that is formed between a chip surface and a clearance surface and extends between a pair of opposite ends of the milling insert. The cutting edge includes a straight main edge, and a part edge that is located between the straight main edge and one of the ends of the milling insert and is shorter than the main edge, the part edge deviating from a straight reference line in the extension of the main edge in the direction of an end of the milling insert at a deviation angle ($\alpha$) of at most 10°.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

FIG. 6 is a side view of said root insert;

FIG. 7 is an enlarged, schematic picture showing the geometry of one end portion of the root insert;

DETAILED DESCRIPTION OF THE PREFERRED EMBODIMENTS

Figure 1:
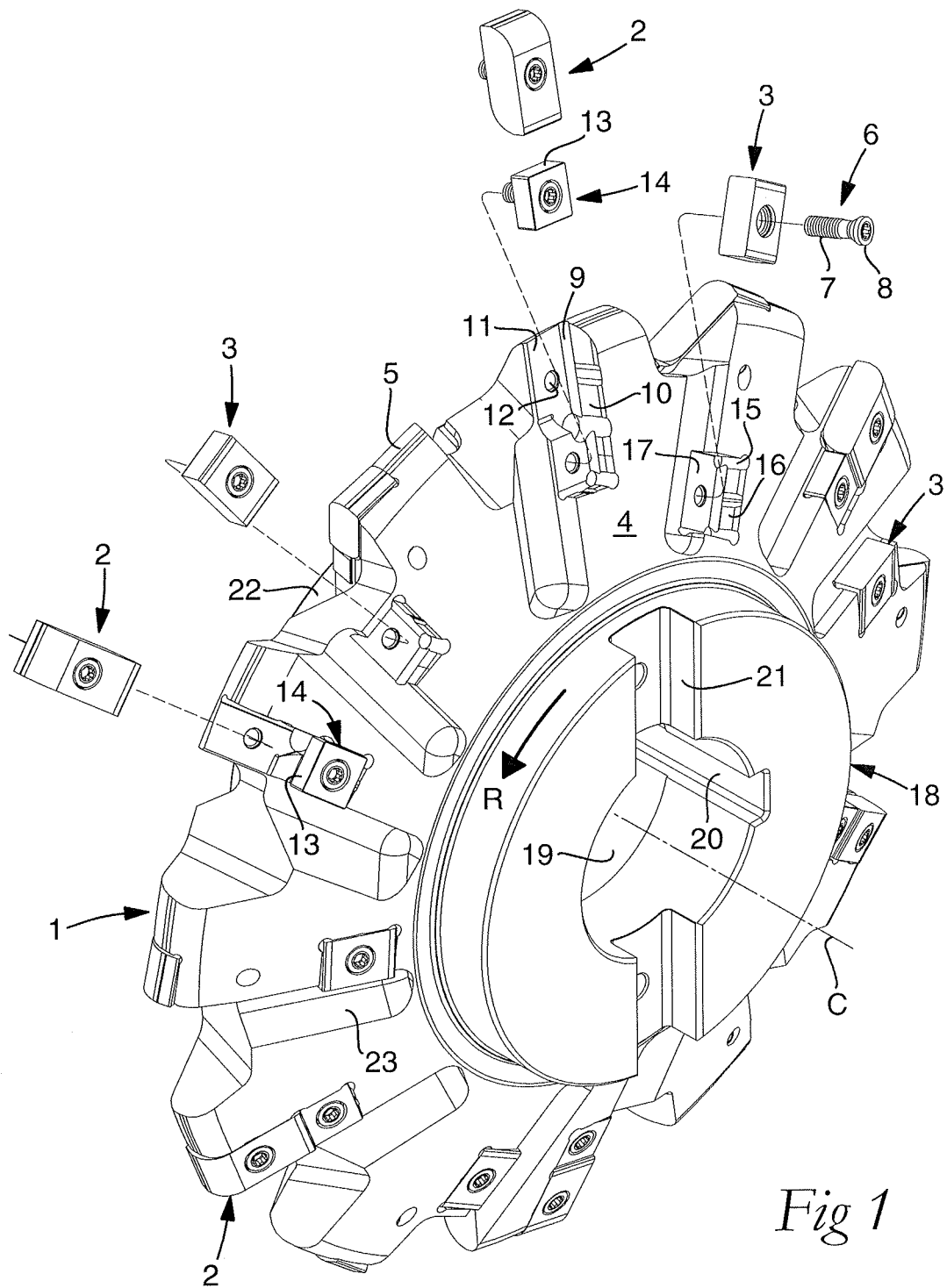
FIG. 1 is a perspective exploded view of a gear milling cutter according to an embodiment of the invention.
Figure 2:
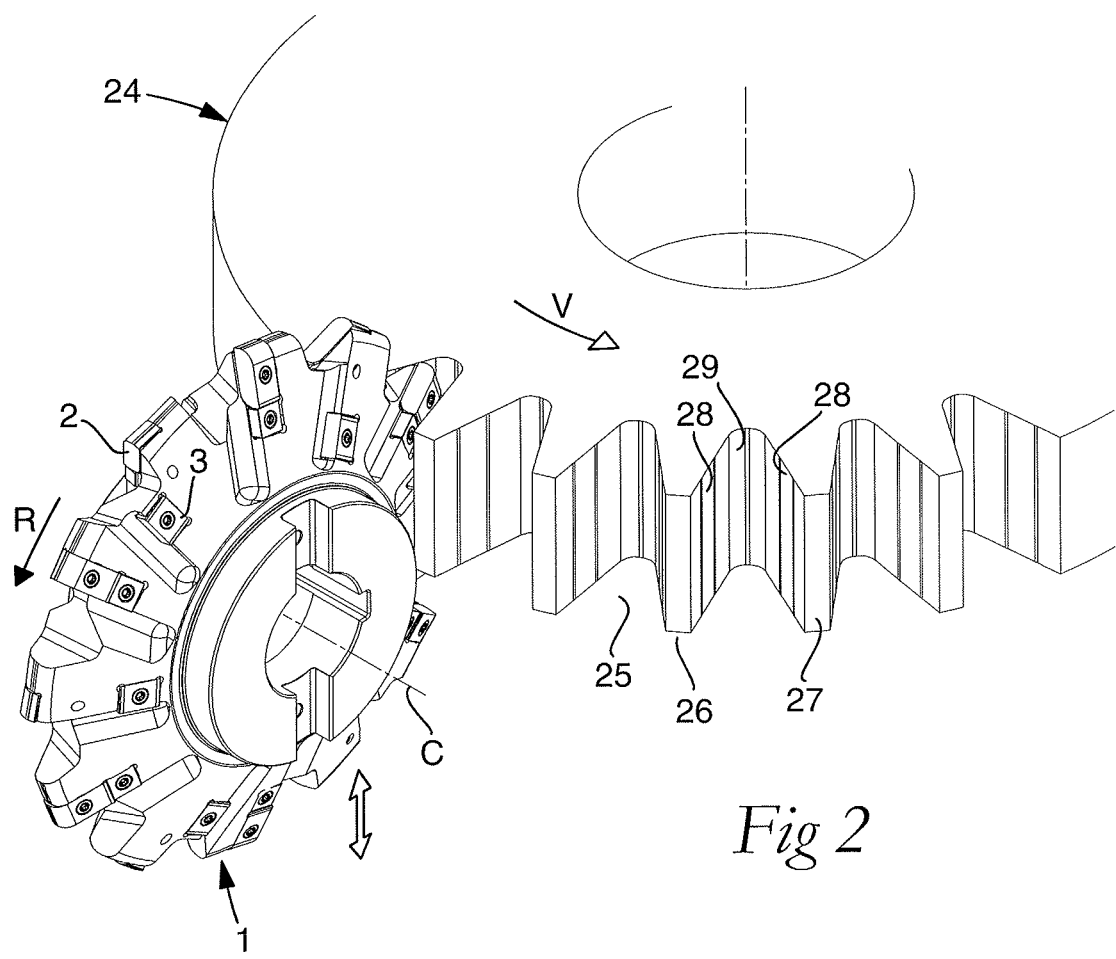
FIG. 2 is a perspective view showing the gear milling cutter during the machining of a disc-shaped workpiece.
Figure 3:
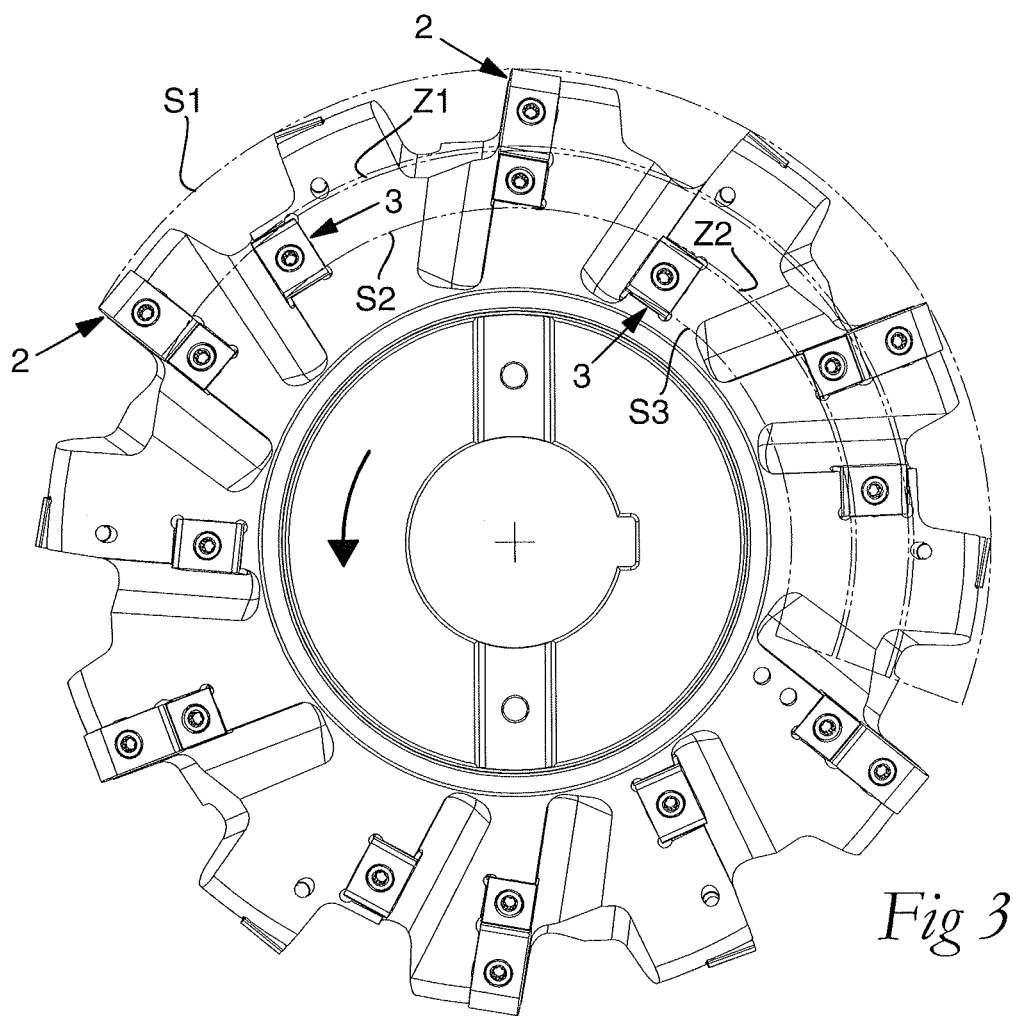
FIG. 3 is a side view of the tool.
Figure 4:
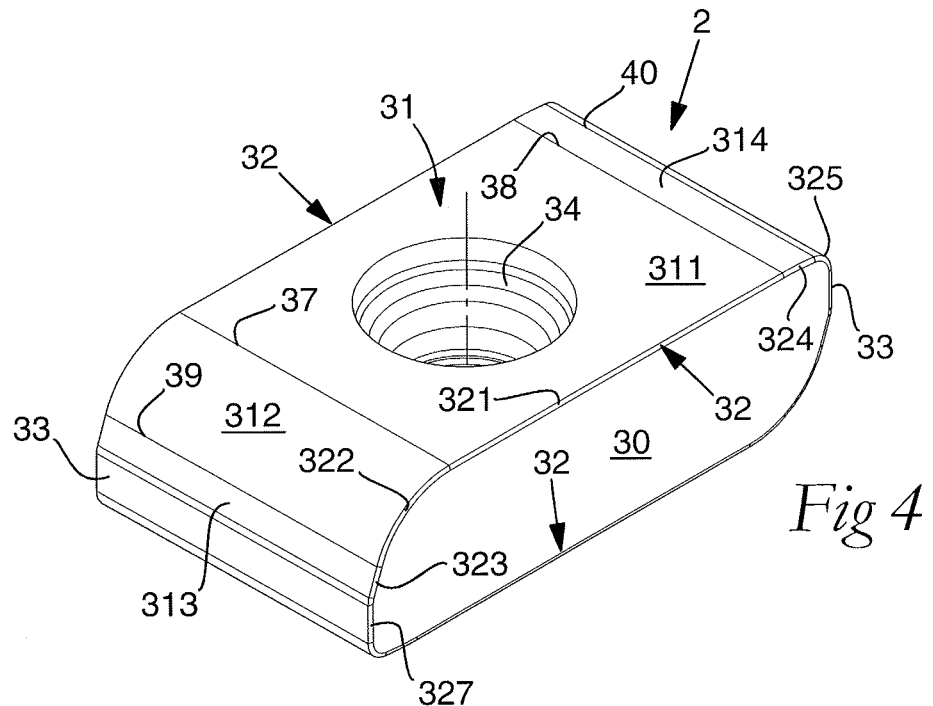
FIG. 4 is an enlarged perspective view of a root insert included in the gear milling cutter.
Figure 5:
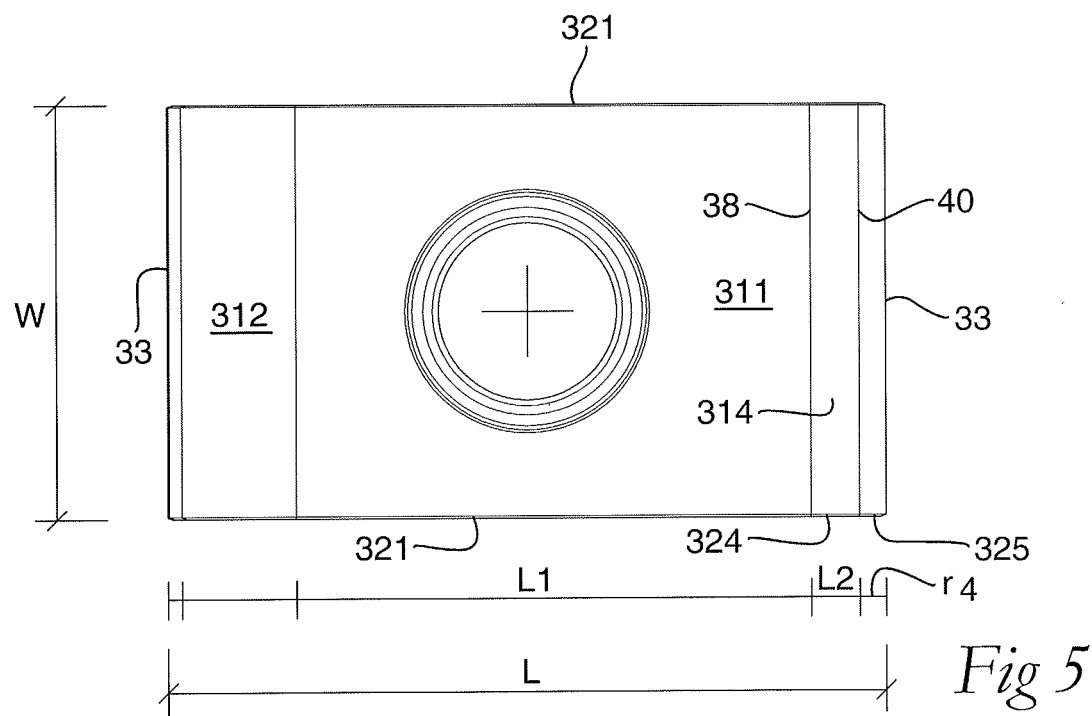
FIG. 5 is a planar view of the root insert according to FIG. 4.
Figure 8:
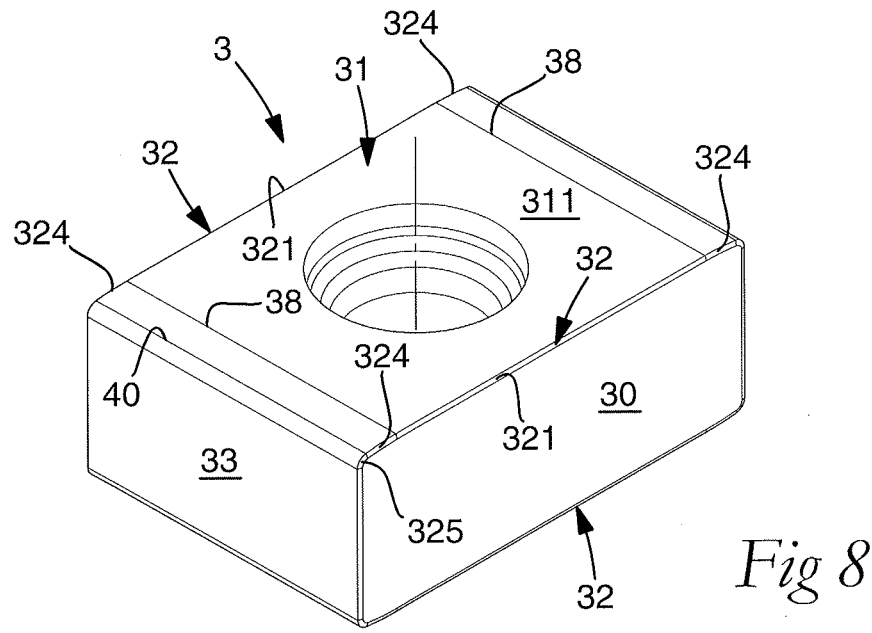
FIG. 8 is a perspective view of a flank insert according to the embodiment and included in the gear milling cutter.
Figure 9:
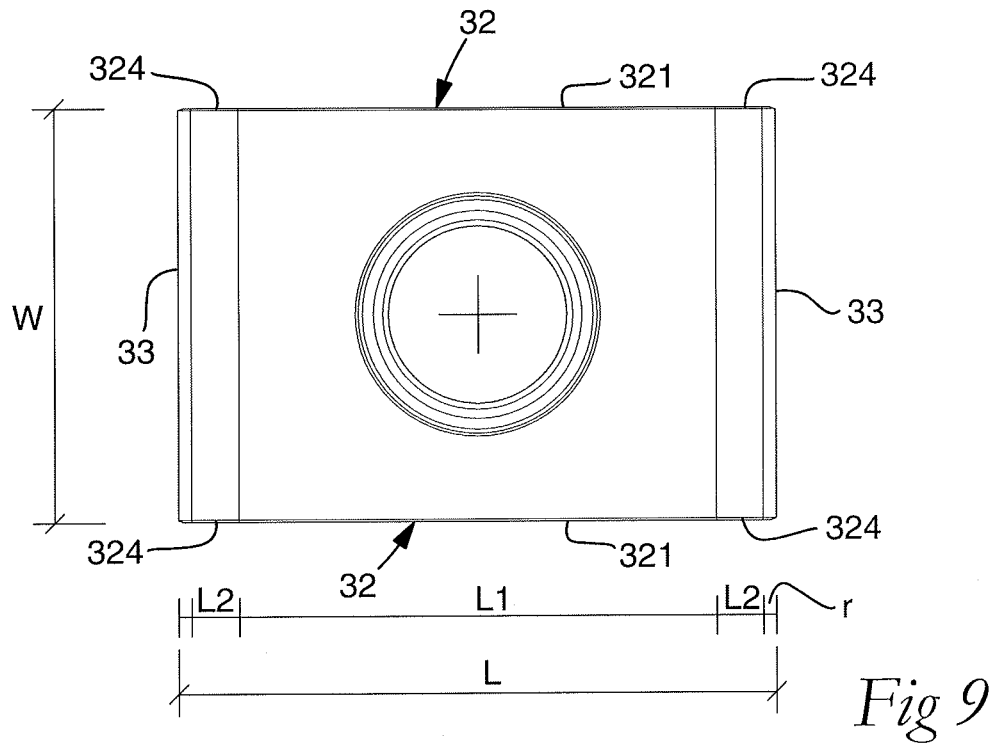
FIG. 9 is a planar view of the flank insert according to FIG. 8.
Figure 10:
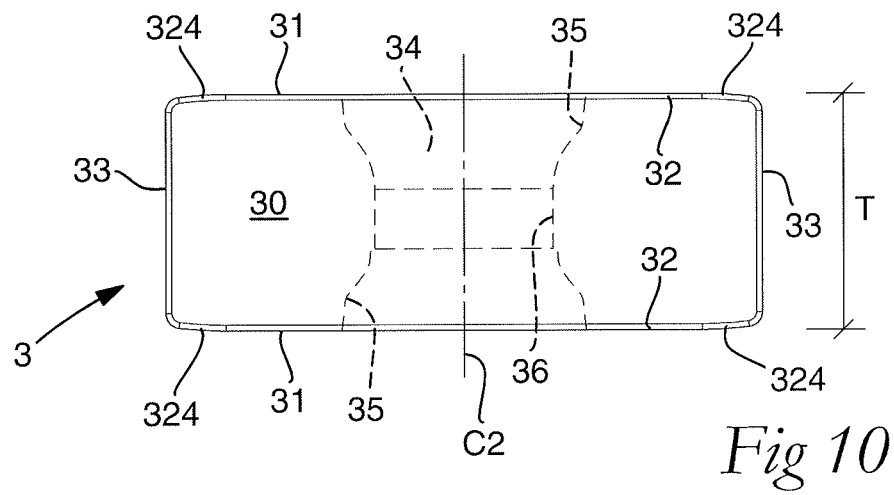
FIG. 10 is a side view of the flank insert.
Figure 11:
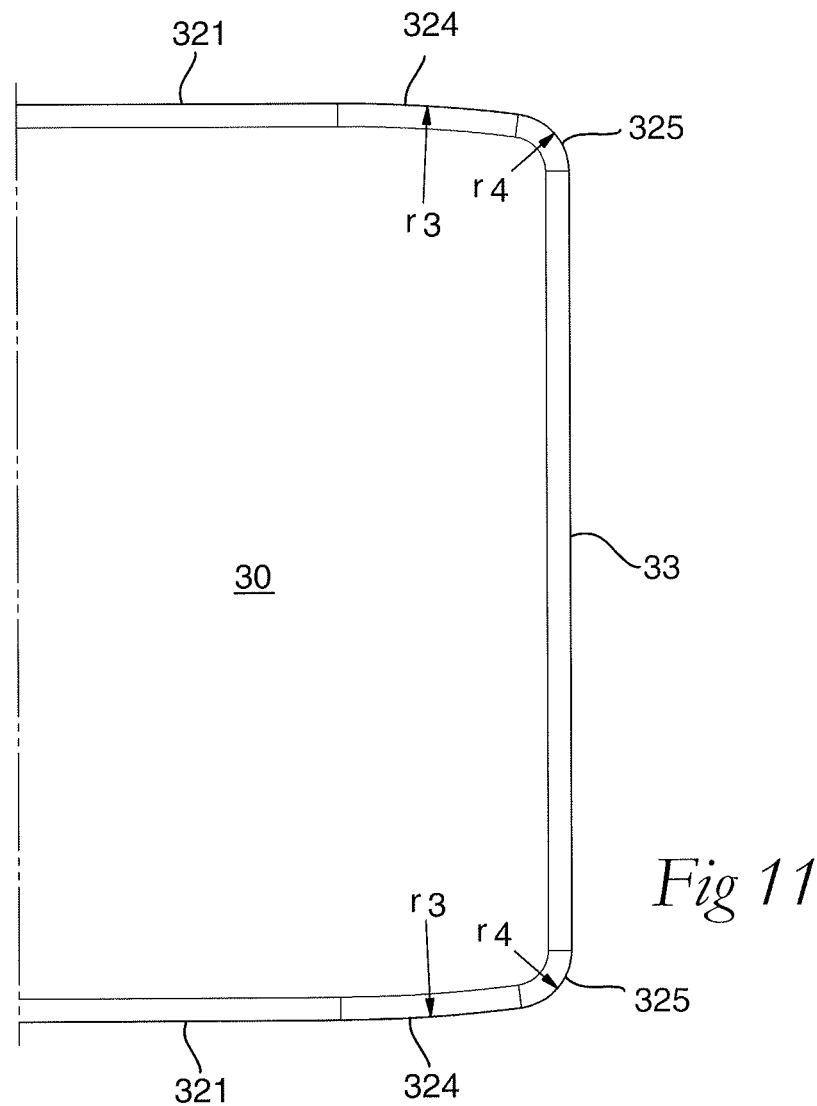
FIG. 11 is an enlarged, schematic picture showing the geometrical design of an end portion of the flank insert.

In FIGS. 1-3, a gear milling cutter is shown, which is made according to an embodiment of the invention and includes a basic body 1 and a plurality of milling inserts 2, 3. The basic body 1 is rotatable around a center axis C and has a rotationally symmetrical basic shape. Thus, the basic body includes two opposite, mirror-symmetrical flank sides 4 that extend radially inward from a common periphery 5. In this case, the flank sides 4 have a conical shape, which imparts a discus-like geometry to the basic body. In a traditional way, the replaceable milling inserts 2, 3 consist of a hard, hard-wearing material, e.g. cemented carbide, while the basic body 1 is manufactured from a softer material, usually steel.

The milling inserts 2, which by those skilled in the art are denominated root inserts, are mounted in the immediate vicinity of the periphery of the basic body, while the milling inserts 3 are mounted along the flank sides 4 of the basic body and are denominated flank inserts. In the shown, preferred embodiment, all milling inserts 2, 3 are invertible and include a plurality of alternately useful cutting edges. The individual milling insert is fixed on the basic body by a screw 6, which in addition to a threaded shank 7 includes a head 8 having a partially conical shape. In mounting, the root insert 2 is placed in a seat or insert seat 9, which is open toward the periphery 5 of the basic body and includes a tangential support surface 10 as well as a side support surface 11, in which a threaded hole 12 for the screw 6 mouths. In this case, a radial support surface 13 is formed on a particular, hard support plate 14 (e.g. of cemented carbide), which is detachably mounted radially inside the milling insert 2. It should be evident that the root insert 2, in its mounted state, has its radially outer end projecting somewhat from the periphery 5.

The individual flank insert 3 is mounted in a seat 15 radially spaced-apart from the periphery 5 and having a parallelepipedic basic shape. In this seat 15, there are included a tangential support surface 16 and a side support surface 17 against which the milling insert 3 is screwed on.

In other respects, the basic body 1 includes a hub part 18 having a through hole 19, to which two different types of keyways 20, 21 connect for the transmission of torque from a drive spindle (not shown) to the milling cutter.

It should also be pointed out that the basic body includes chip gaps 22, 23, which are situated in front of the respective milling insert 2, 3 as viewed in the direction of rotation R of the milling cutter.

In FIG. 2, the milling cutter is shown in connection with the machining of a workpiece 24 that in this case has the shape of a ring or circular disc, which in practice is fixed on a turnable holder (not shown), by which the disc can be turned stepwise up to a working position of the milling cutter. The milling cutter is in turn vertically movable (see the double arrow) for milling out a gash or tooth gap 25 that, together with an adjacent gap, delimits a tooth or cog 26. The teeth 26 includes a crest 27 as well as two flanks 28, which converge toward a common bottom 29 in the individual gap 25 and which in this case are plane or "straight". The inner portion of the individual tooth 26, which is surrounded by two gap bottoms 29, is denominated "root". In this case, the peripheral root inserts 2 of the milling cutter have the purpose of forming a rounded bottom 29 in the individual gap 25, while the flank inserts 3 should form the plane or straight tooth flanks 28.

Reference is now made to FIGS. 4-7, which in detail illustrate the design of the individual root insert 2. In the shown, preferred embodiment, the milling insert 2 is double-sided and invertible, as well as in addition formed in such a way that the same can be used either one of the two opposite flank sides 4 of the basic body 1. For these reasons, the milling insert is formed with a pair of plane and mutually parallel surfaces generally designated 31, which alternately can be used as a clearance surface and as a bottom surface against the side support surface 11 of the seat 9. Henceforth, however, these surfaces 31 are only denominated "clearance surfaces". Furthermore, two opposite chip surfaces 30 are included, which like the clearance surfaces are plane and mutually parallel. Each individual chip surface 30 forms an angle of 90° with the individual clearance surface 31. Along the edge where the surfaces 30, 31 meet (see FIG. 4), a cutting edge designated 32 is therefore formed. Along each chip surface 30, there are two such cutting edges 32 in order to allow inversion of the milling insert. The individual chip surface 30 extends between two opposite ends 33 in the form of plane surfaces, which in the example extend perpendicularly to the chip surfaces 30.

In order to functionally separate the two cutting edges 32 from each other, in FIG. 6 (but not in the other figures), the same have been provided with the suffixes a and b, respectively. In addition, the two ends have been designated 33a and 33b, respectively. When the root insert is mounted in the appurtenant seat 9 in the basic body, with the purpose of using the cutting edge 32a for chip removal, the end 33a is turned radially outward, while the end 33b is turned radially inward toward the center of the basic body. The clearance surface designated 31b is then pressed against the side support surface 11 of the seat 9, while the clearance surface 31a is exposed outward from the seat.

In addition to a straight main edge 321 adjacent to the plane part 311 of the clearance surface 31, the individual cutting edge 32 includes a number of part edges designated 322, 323, 324 and 325. Among these, the part edge 322 is arched and has a moderate arc radius r1 (see FIG. 7), while the part edge 323 is straight. The arched part edge 322, which has the purpose of forming one half of the rounded, concave bottom 29 in the individual gash 25, connects to the main edge 321 as well as to the part edge 323 by being tangent to the same. The straight part edge 323 transforms into an inactive, straight edge 327 of the end surface 33 via a conventional radius transition 326 having the radius r2.

Before the root insert 2 is described further in detail, reference is made to FIG. 3, which shows how the radially separated milling inserts 2, 3 have different sweep areas. A first sweep area, which is shown behind a root insert 2 as viewed in the direction of rotation, is designated S1. It should be axiomatic that the sweep area is circularly ring-shaped and has a width or radial extension that is determined by the length L of the root insert (see FIG. 5). Behind a rotationally trailing, outer flank insert 3, in FIG. 3, there is further shown a sweep area S2 of said insert. The sweep area of the next trailing inner flank insert 3 is designated S3. By the fact that the radially inner end of the root insert 2 has been located nearer the center axis C of the basic body than the radially outer end of the trailing flank insert 3, the two sweep areas S1 and S2 will overlap each other in a ring-shaped overlapping zone designated Z1. Between the sweep areas S2 and S3 of the outer and inner, respectively, flank inserts 3, an overlapping zone designated Z2 is present in an analogous way. This overlapping zone is obtained as a consequence of the inner end of the outer flank insert 3 being located nearer the center axis C than the outer end of the inner flank insert 3.

In this connection, it should be borne in mind that the different, tangentially spaced-apart milling inserts engage and dig into the workpiece in steps separated in time. For instance, when a root insert 2 has passed a certain geometrical locus in the workpiece and dug out a circular "chute", the depth of which depends on the feed of the milling cutter, the rotationally trailing, outer flank insert will pass the same geometrical locus not until a short moment later, and in that connection generate a chute being inside and that cuts into the first chute along an arc line or point of intersection situated in the overlapping zone Z1. The same phenomenon arises of course also in the overlapping zone Z2 between the flank inserts.

The unpredictable surface imperfections initially described, which may make the concluding finishing of the flanks of the teeth more difficult, occur foremost in the overlapping zones between the sweep areas, and are due to the overlapping end portions of the cutting edges in previously known gear milling cutter inserts being straight all the way up to the end surface of the milling insert and transforming into the same via a fairly sharp corner (this is the case even if the corner region is a traditional radius transition having a diminutive radius). If a pair of co-operating milling inserts have been dislocated in one way or the other in relation to the prescribed, desired space positions thereof, or include shape defects, the risk arises of the corners in the overlapping zone digging in differently deep into the flanks of the teeth to be made and giving rise to miscellaneous malformations in the same. Such malformations may, in an unpredictable way, be concavities (grooves, recesses, etc.) as well as convexities (crests, ridges, etc.), wherein concavities as well as convexities may occur helter-skelter in an irrational way. In other words, the rough-milled surfaces of the tooth flanks will get a shape or character that cannot be predetermined or precalculated.

Figure 14:
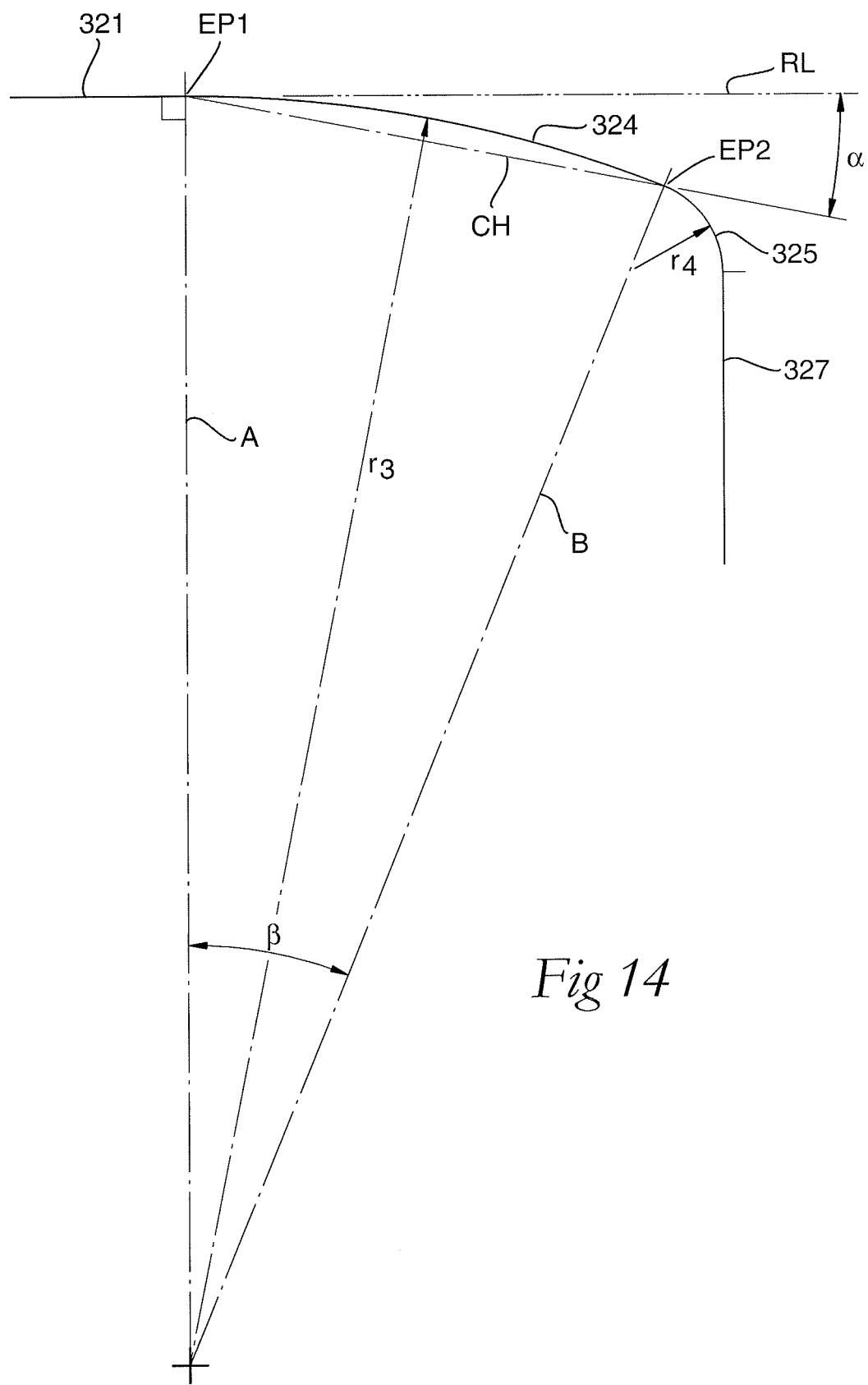
FIG. 14 is a schematic picture showing the geometry characteristic of the embodiment in connection with an end of a milling insert.

Reference is now made again to FIGS. 4-7, from which it is seen that the milling insert according to the embodiment includes not only a conventional radius transition 325 in the area where the main edge 321 transforms into the inactive edge 327 along the end surface 33, but also an additional part edge 324. The geometrical design of this part edge 324 is seen on an enlarged scale in FIG. 14. In the present, preferred embodiment of the milling insert, the part edge 324 is arched and defined geometrically by a circular arc that extends between the end points EP1 and EP2. The radius of the circular arc is designated r3 and its chord CH. Characteristic of the part edge 324 is that the same is shorter than the main edge 321, as well as that it deviates from a straight reference line RL in the extension of the main edge. More precisely, the part edge 324 deviates successively in the direction of the end surface 33 of the milling insert in a deviation angle designated α (which is the angle between the reference line RL and the chord CH). One of the two radial lines, which is included in an imaginary sector of a circle of the part edge 324, viz. the radial line A, forms a right angle with the straight main edge 321. In other words, the point EP1 forms a tangential point between the main edge 321 and the part edge 324.

Between the part edge 324 and the edge 327 of the plane end surface 33 that extends perpendicularly in relation to the main edge 321, in this case, a radius transition 325 having the radius r4 is also formed. As is seen to the naked eye in FIG. 14, the arc radius r3 of the part edge 324 is considerably greater than the radius r4 of the radius transition. Thus, in a prototype design of the milling insert, r4 amounts to 1 mm, while r3 amounts to 13 mm. It should be noted that the arc angle β of the circular sector is greater than the deviation angle α.

The geometrical design of the individual flank insert 3 is seen in detail in FIGS. 8-11. Like the root insert 2, the flank insert 3 includes a pair of opposite chip surfaces 30, a pair of opposite clearance surfaces 31, and a pair of opposite end surfaces 33. Along each chip surface 30, two cutting edges 32 are formed, which like the cutting edges of the root insert 2 include a straight main edge 321 and two part edges (see FIGS. 8 and 9), which are situated between the main edge and the two end surfaces 33. However, in contrast to the cutting edges of the root insert 2, the individual cutting edges 32 of the flank insert 3 include two identical part edges 324 (henceforth denominated "overlapping part edges"), which only have the purpose of overlapping the sweep area of an analogous overlapping part edge of another, adjacent milling insert. In other words, the flank insert 3 lacks the gap bottom-forming part edge 322 included in the root insert 2.

Like the root insert 2, the flank insert 3 (see FIG. 10) includes a through hole 34 that extends perpendicularly to the clearance surfaces 31 and mouths in the same via funnel-shaped cavities 35, which are separated by a ring-shaped shoulder 36. Irrespective of which cutting edge 32 that is to be used, i.e., irrespective of which clearance surface 31 that is facing outward from a side support surface 11, 17 in the appurtenant seat, the head 8 of the screw 6 (see FIG. 1) can be countersunk in a cavity 35 and tightened against the shoulder 36.

In the root insert 2 as well as in the flank insert 3, the overlapping part edge 324 is considerably shorter than the straight main edge 321 of the individual cutting edge 32. This is seen best in FIGS. 5 and 9, which admittedly—for the sake of simplicity—show the lengths of the different edge parts in plane elevation, and therefore do not claim to show absolutely exact linear dimensions, but which however give a good picture of the proportions between the various lengths.

In the prototype design of the milling cutter, the root insert 2 has a total length L of 24 mm (see FIG. 5), a width W of 14 mm, as well as a thickness T of 7 mm. Herein, the length L1 of the straight main edge 321 amounts to 15.8 mm, while the overlapping part edge 324 has a length L2 of 1.6 mm. Simultaneously, the radius r4 of the radius transition 325 amounts to 1 mm. Herein, the radius r3 of the overlapping part edge 324 (see FIG. 15) amounts to 13 mm. This should be compared with the arc radius r1 of the gap bottom-forming part edge 322, which in the example amounts to 4 mm. In other words, the arc radius r3 of the overlapping part edge 324 is many times greater than the arc radius r1 of the gap bottom-forming part edge 322. In the example, the length L2 of the overlapping part edge 324 amounts to approx. 1/10 (=10%) of the length L1 of the main edge 321. In practice, this relationship may of course vary. However, L2 should amount to at least 5% and at most 20% of L1.

Furthermore, in the prototype design, the deviation angle α of the overlapping part edge 324 amounts to approx. 3° (note that the angle α in FIG. 15 is shown exaggeratedly large for the sake of clarity). Also this angle may vary, but should amount to at least 0.5° and at most 10°. Suitably, α is within the range of 1-5°.

With reference to FIGS. 8-11, it should be pointed out that the individual flank insert 3 of the prototype design has a length L of 20 mm, a width W of 14 mm, as well as a thickness T that amounts to 8 mm. In this case, the (projected) length L2 of the part edge 324 amounts to 1.5 mm and the length L1 of the main edge 321 to 16 mm, the radius transitions having a radius r4 of 0.5 mm. It should be axiomatic that all four overlapping part edges 324 of the milling insert are identical, the deviation angle α of the part edges in this case amounting to approx. 1°.

From the above, it is seen that the overlapping part edges 324 have a radius r3 (>12 mm) that is considerably greater than the radius r1 (=4 mm) of the gap bottom-forming part edge 322. In practice, r3 should be greater than the thickness T of the milling inserts whereas r1 is smaller (in other words, the center of the circular arc that defines the part edge 322 is situated inside the milling insert, while the center of the circular arc of the part edge 324 is situated outside the milling insert).

In the exemplified, preferred embodiment of the milling cutter, the root insert 2 as well as the flank insert 3 has a negative cutting geometry as a consequence of the chip surfaces 30 forming right angles with the clearance surfaces 31. In this connection, the shape of the cutting edges is determined by the shape of the connecting portions of the clearance surfaces. Thus, the main edge 321 obtains its straight shape as a consequence of the connecting part 311 of the clearance surface 31 being plane, while the part edges 322 and 324 obtain their arc-shape (see FIGS. 4 and 8) as a consequence of the connecting surface portions 312, 314 having a convexly arched shape. The boundary lines between the plane part 311 of the individual clearance surface 31 and the two convex surface portions 312, 314 are designated 37, 38, while 39 designates a boundary line between the surface portion 312 and the part surface 313 that connects to the part edge 323. In an analogous way, the surface portion 314 is delimited not only by the boundary line 38 but also by a boundary line 40 to the arched surface portion that connects to the radius transition 325.

Figure 12:
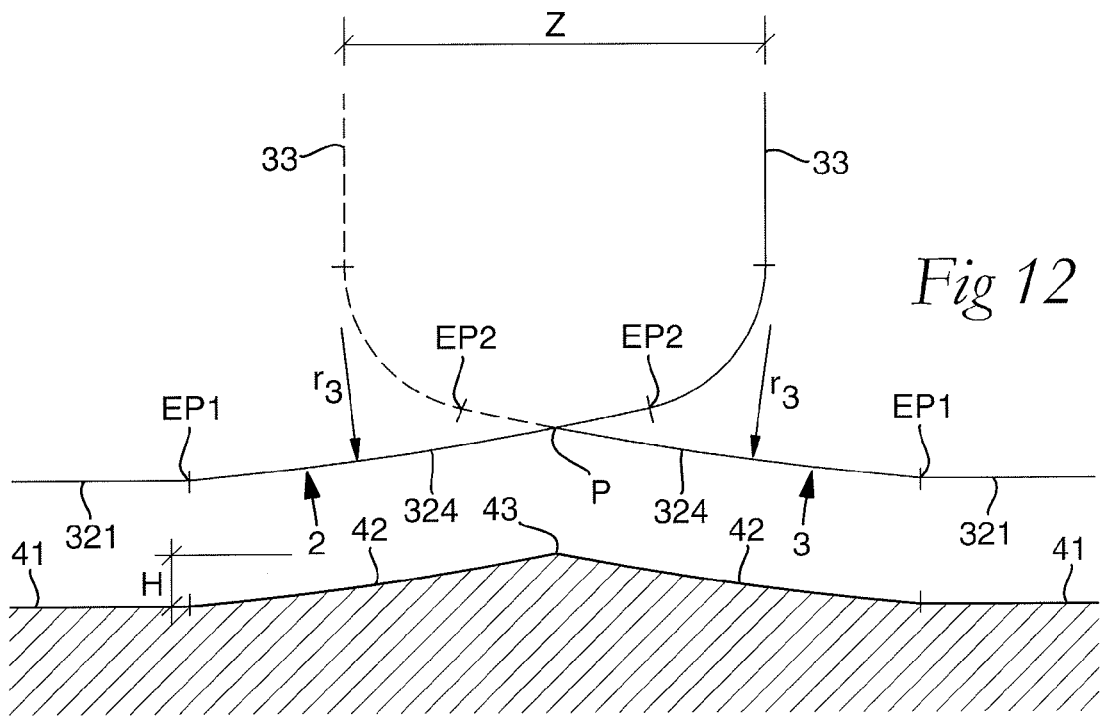
FIG. 12 is an extremely enlarged, schematic picture that illustrates the geometry of two mutually overlapping milling inserts of the milling cutter according to the embodiment.
Figure 13:
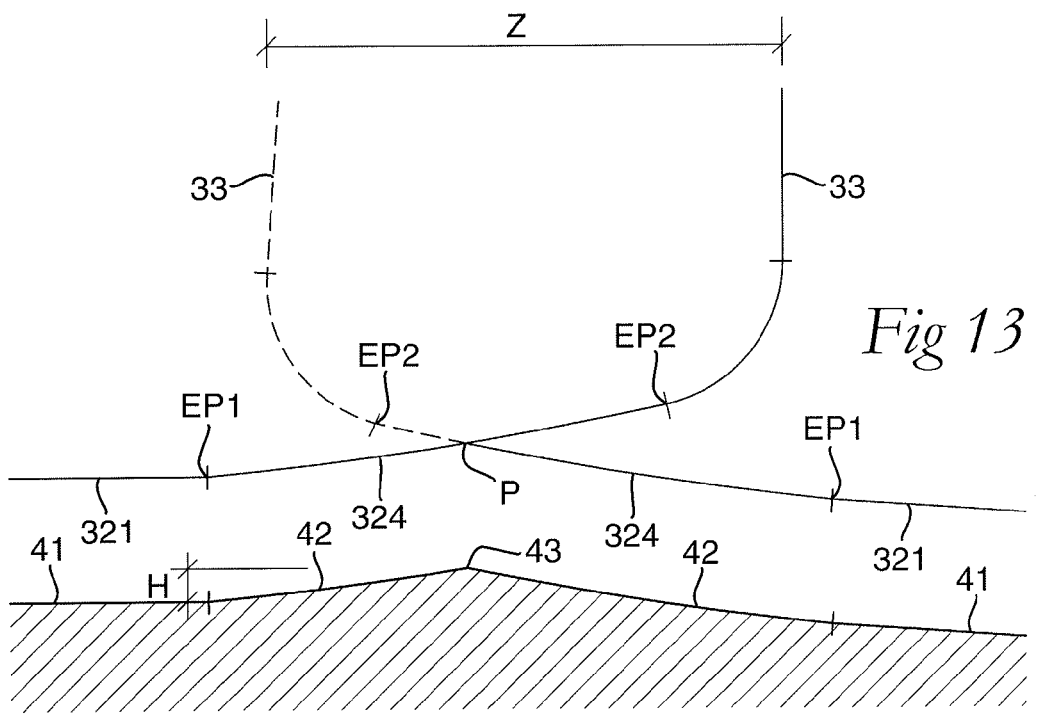
FIG. 13 is a picture analogous to FIG. 12 showing an alternative overlapping relationship between the milling inserts.

During the milling of gashes in the way illustrated in FIG. 2, each individual root insert 2 will, by the part edge 322, mill out one half of the rounded bottom 29 of the gash 25, at the same time as the straight main edge 321 generates the innermost, plane portion of a tooth flank 28. The remaining parts of the tooth flanks 28 are milled out by the radially separated flank inserts 3. In doing so, continuous tooth flanks are obtained as a consequence of the milling inserts overlapping each other in the aforementioned overlapping zones. Such an overlapping zone Z1 is illustrated schematically on an enlarged scale in FIGS. 12 and 13, where the points EP1 indicate the transitions between the straight main edges 321 of the individual cutting edges and the connecting, arched part edges 324 (cf. the boundary line 38 in FIGS. 4 and 8), and EP2 indicate the transitions between the part edges 324 and the radius transitions 325 (see the boundary line 40 in FIGS. 4 and 8). In FIGS. 12 and 13, the left milling insert is assumed to be a root insert 2, which is outlined by a solid line, while the right one is a flank insert 3, which partly is shown by a dashed line to illustrate that this rotationally trails the root insert. In FIG. 12, an ideal case is shown, in which the straight main edges 321 of the two co-operating cutting edges are located in a common plane, an imaginary point of intersection P being situated halfway between the end points EP1 of the main edges. In this state, the main edges generate two plane part surfaces 41, which transform into arched part surfaces 42 that meet each other in a crest or ridge 43 having the height H.

In the example according to FIG. 13, it is shown how the milling inserts 2, 3 for one reason or another (bad result in the insert production, insufficient precision of the insert seats of the basic body, etc.) have not assumed the ideal, desired positions thereof in relation to each other. By those skilled in the art, this phenomenon is denominated "mis-match". Thus, in this case, the straight main edges 321 are no longer located in a common plane. In addition, they have been displaced rectilinearly in relation to each other in such a way that the width of the overlapping zone Z increases. In spite of this mis-match, the inevitable surface defect will still be a convexity in the form of a ridge 43 that is located in the overlapping zone.

It should be emphasized that the scale in FIGS. 12 and 13 is extremely enlarged. In reality, the height H, i.e., the level difference between the crest of the ridge 43 and the surrounding plane surfaces 41 of the workpiece, may accordingly be very small and be within the range of 1/100-1/1000 mm. Nevertheless, the ridge forms a marked convexity, rather than a concavity. In other words, the overlapping part edges 324 characteristic of the embodiment ensure that the milling inserts in a repeatable and reliable way always generate surfaces that have a predictable, smooth wave shape and lack surface defects difficult to master in the form of grooves, scratches or other recesses in the surfaces. In such a way, the concluding finishing of the teeth or cogs is significantly facilitated, above all in respect of the prospects of meeting prescribed tolerances, e.g., of expensive workpieces.

The invention is not limited only to the embodiments of the gear milling cutter insert exemplified in the drawings. Thus, the shape and dimensions of the milling insert may vary most considerably within the scope of the invention. Among other things, the characteristic overlapping part edge could be straight instead of arched (r3=∞). It is also possible to form the overlapping part edge without any radius transition to the edge of the inactive end surface of the milling insert. In other words, the part edge could transform into the edge via a sharp corner, because such a corner would come to be located outside the point of intersection P of the part edges 324 (see FIGS. 12 and 13). Furthermore, the deviation angle as well as the length of the characteristic overlapping part edges may vary within wide limits depending on the desired feed and the desired surface finish. In addition, the milling insert may be formed with a positive cutting geometry, i.e., with a cutting edge angle that is smaller than 90°. The milling insert does neither necessarily need to be invertible by including two or more cutting edges. Thus, it is possible to manufacture the milling insert with only one cutting edge having the shape characteristic of the invention.

In conclusion, it should be pointed out that the concept "straight" main edge should be interpreted in a wide sense. Instead of being absolutely straight in the proper sense of this word, the main edge could be slightly cambered, e.g., having a camber radius of 1000 mm or more.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A gear milling cutter comprising:
a basic body being rotatable around a center axis and having a rotationally symmetrical basic shape, which includes two opposite flank sides that extend radially inward from a periphery of the basic body; and
a plurality of replaceable milling inserts, which are mounted on the flank sides,
wherein the plurality of milling inserts individually comprise a cutting edge formed where one chip surface and one clearance surface meet and extends between a pair of opposite and radially separated ends of the milling insert,
wherein some of the plurality of milling inserts are root inserts, which are placed in tangentially spaced-apart positions along the periphery of the basic body,
wherein others of the plurality of milling inserts are flank inserts, which are tangentially spaced-apart and placed in at least one ring formation located radially inside the root inserts,
wherein sweep areas of radially separated milling inserts overlap each other in a ring-shaped overlapping zone by radially inner ends of at least the root inserts being situated nearer the center axis of the basic body than radially outer ends of the flank insert next inside,
wherein, in side view, the cutting edge of each milling insert includes a straight main edge, and a first part edge that is located between the straight main edge and one of the ends of the milling insert and is shorter than the main edge, the first part edge deviating from a straight reference line in the extension of the main edge in a direction of an end of the milling insert at a deviation angle ($\alpha$) of at most 10°, and
wherein the cutting edges of the root inserts radially overlap the cutting edges of the next inside flank inserts in a point of intersection situated between end points of the first part edges.

2. The gear milling cutter according to claim 1, wherein the deviation angle ($\alpha$) amounts to at least 0.5°.

3. The gear milling cutter according to claim 1, wherein each milling insert is invertible by including two plane and mutually parallel clearance surfaces, and two cutting edges along a chip surface.

4. The gear milling cutter according to claim 3, wherein each milling insert includes two opposite chip surfaces, and a pair of cutting edges along each one of the two chip surfaces.

5. The gear milling cutter according to claim 3, wherein a through hole extends between the two clearance surfaces of the milling insert and mouths in the two clearance surfaces via funnel-shaped cavities, in which a head of a screw is countersunk.

6. The gear milling cutter according to claim 1, wherein the first part edge of each milling insert is arched by geometrically being defined by a circular arc, the chord of which determines the deviation angle ($\alpha$) of the first part edge, and which has a radius that is greater than a thickness of the milling insert.

7. The gear milling cutter according to claim 6, wherein the cutting edge of each root insert includes two part edges having different shapes connecting to the main edge, the first part edge being for overlapping, and a second part edge being arched for the formation of a bottom in a gash and having an arc radius that is smaller than the thickness of the milling insert.

8. The gear milling cutter according to claim 6, wherein the cutting edge of each flank insert includes two identical first part edges transforming into the main edge for overlapping.

9. A set of gear milling cutter inserts, comprising:
at least one root insert and at least one flank insert,
wherein each of the one root insert and the at least one flank insert includes a cutting edge that is formed where one chip surface and one clearance surface meet,
wherein the cutting edge extends between a pair of opposite and radially separated end surfaces of the milling insert, and
wherein, in side view, the cutting edge includes a straight main edge, and a first part edge for radially overlapping between the root insert and next inside flank insert, the first part edge being located between the straight main edge and one of the ends of the milling insert and is shorter than the main edge, the first part edge deviating from a straight reference line in the extension of the main edge in a direction of an end of the milling insert at a deviation angle ($\alpha$) of at most 10°.

10. The set of gear milling cutter inserts according to claim 9, wherein the deviation angle ($\alpha$) amounts to at least 0.5°.

11. The set of gear milling cutter inserts according to claim 9, wherein the milling insert is invertible by including two plane and mutually parallel clearance surfaces, and two cutting edges along a chip surface.

12. The set of gear milling cutter inserts according to claim 11, comprising two opposite chip surfaces, and a pair of cutting edges along each one of the two chip surfaces.

13. The set of gear milling cutter inserts according to claim 11, wherein a through hole extends between the two clearance surfaces and mouths in the two clearance surfaces via funnel-shaped cavities, in which a head of a screw can be countersunk.

14. The set of gear milling cutter inserts according to claim 9, wherein the first part edge is arched by geometrically being defined by a circular arc, the chord of which determines the deviation angle ($\alpha$) of the first part edge, and which has a radius that is greater than a thickness of the insert.

15. The set of gear milling cutter inserts according to claim 9, wherein each end surface of the at least one root insert, in side view, is joined to the main edge of a first of the clearance surfaces by the first part edge and to the main edge of a second of the clearance surfaces by a second part edge, and wherein the first and second part edges have different shapes, the first part edge being for overlapping, and the second part edge being convex for the formation of a bottom in a gash.

16. The set of gear milling cutter inserts according to claim 9, wherein each cutting edge of the at least one flank insert, in side view, includes two first part edges that are identical and transform into the main edge for overlapping.

17. The set of gear milling cutter inserts according to claim 9, wherein the at least one root insert, in side view, mutually parallel straight end edges are oriented perpendicular to the straight main edges, each end edge is separated from a first straight main edge by two radiused edges, one of which corresponds to the first part edge, and is separated from a second straight main edge by two radiused edges and one straight edge, one of the two radiused edges being a second part edge.

18. The set of gear milling cutter inserts according to claim 9, wherein, in side view, the first part edge is straight.

19. The set of gear milling cutter inserts according to claim 9, wherein, in side view, each end of the at least one flank insert includes two cutting edges, wherein each of the two cutting edges include the straight main edge and the first part edge, and wherein the two cutting edges are mirror symmetric across a plane perpendicular to and bisecting the chip surface.

20. The gear milling cutter according to claim 1, wherein, in side view, the first part edge of each milling insert is straight.

21. The gear milling cutter according to claim 1, wherein the first part edge has a different shape than the second part edge.

* * * * *